(12) United States Patent
Neveux

(10) Patent No.: US 9,709,848 B2
(45) Date of Patent: Jul. 18, 2017

(54) TRANSFLECTIVE LIQUID CRYSTAL DISPLAY

(71) Applicant: Nathanael Neveux, Providence, RI (US)

(72) Inventor: Nathanael Neveux, Providence, RI (US)

(73) Assignee: Amel Technology, LLC, Johnston, RI (US)

( * ) Notice: Subject to any disclaimer, the term of this patent is extended or adjusted under 35 U.S.C. 154(b) by 0 days.

(21) Appl. No.: 15/403,938

(22) Filed: Jan. 11, 2017

(65) Prior Publication Data

US 2017/0123270 A1    May 4, 2017

Related U.S. Application Data

(63) Continuation of application No. PCT/US2015/026300, filed on Apr. 17, 2015.

(51) Int. Cl.
*G02F 1/1335* (2006.01)
*G09G 3/36* (2006.01)

(52) U.S. Cl.
CPC .. *G02F 1/133602* (2013.01); *G02F 1/133514* (2013.01); *G02F 1/133555* (2013.01);
(Continued)

(58) Field of Classification Search
CPC ......... G02F 1/133602; G02F 1/133514; G02F 1/133555
(Continued)

(56) References Cited

U.S. PATENT DOCUMENTS 5,841,494 A    11/1998   Hall
6,710,831 B1   3/2004    Winker et al.
(Continued)

FOREIGN PATENT DOCUMENTS

WO    WO2016/167788 A2    10/2016

OTHER PUBLICATIONS

Korean Intellectual Propery Office, International Search Report, PCT/US2015/026300 (published as WO2016/167788), Apr. 22, 2016.
(Continued)

*Primary Examiner* — Lucy Chien
(74) *Attorney, Agent, or Firm* — Buchanan Law, LLC; Karen A. Buchanan

(57) ABSTRACT

A pixel of a transflective liquid crystal display panel having a controllable backlight comprises an array of sub-pixels and a color substrate with an array of colors corresponding to the array of sub-pixels, the array of colors comprising transmissive colors and reflective colors. The color substrate transmits at least one wavelength of light corresponding to the transmissive colors in the array of colors when the controllable backlight emits a first predetermined light level and, from substantially the same area in the color substrate, reflects at least one wavelength of light corresponding to the reflective colors in the array of colors when the controllable backlight emits a second predetermined light level. The transmissive colors may be primary or secondary colors, and the reflective colors may be primary or secondary colors. The primary colors may form the top row of the array of sub-pixels and the secondary colors may form the bottom row of the array of sub-pixels, or at least one of the primary colors and at least one of the secondary colors may form the top row of the array of sub-pixels, and at least one of the
(Continued)

primary colors and at least one of the secondary colors may form the bottom row of the array of sub-pixels.

20 Claims, 5 Drawing Sheets

(52) U.S. Cl.
CPC ............... *G09G 3/3607* (2013.01); *G02F 2001/133521* (2013.01); *G02F 2001/133626* (2013.01); *G02F 2201/52* (2013.01); *G02F 2203/01* (2013.01); *G09G 2360/144* (2013.01)

(58) Field of Classification Search
USPC ........................................... 349/61, 114, 106
See application file for complete search history.

(56) References Cited

U.S. PATENT DOCUMENTS

| | | | |
|---|---|---|---|
| 7,027,118 B1 | 4/2006 | Wu et al. |
| 7,230,663 B1 | 6/2007 | Wu et al. |
| 7,518,678 B2 | 4/2009 | Kao et al. |
| 7,636,076 B2 | 12/2009 | Hung et al. |
| 7,688,409 B2 | 3/2010 | Wu et al. |
| 7,745,986 B2 | 6/2010 | Ito et al. |
| 7,760,297 B2 | 7/2010 | Takizawa |
| 7,936,426 B2 | 5/2011 | Harding et al. |
| 7,956,963 B2 | 6/2011 | Chien |
| 7,956,966 B2 | 6/2011 | Yoon et al. |
| 7,965,357 B2 | 6/2011 | Van De Witte et al. |
| 8,111,355 B2 | 2/2012 | Chu |
| 8,223,303 B2 | 7/2012 | Cheng et al. |
| 8,462,144 B2 | 6/2013 | Jepsen |
| 8,692,963 B2 | 4/2014 | Lu et al. |
| 2006/0038953 A1* | 2/2006 | Moriya ............. G02F 1/133514 349/144 |
| 2006/0274235 A1* | 12/2006 | Takizawa ........... G02F 1/133514 349/108 |
| 2007/0057881 A1 | 3/2007 | Yu et al. |
| 2007/0164953 A1 | 7/2007 | Huang et al. |
| 2008/0174716 A1 | 7/2008 | Chen et al. |
| 2011/0148832 A1 | 6/2011 | Nie et al. |
| 2012/0062812 A1 | 3/2012 | Wu |
| 2012/0127140 A1 | 5/2012 | Ryan et al. |
| 2013/0222748 A1 | 8/2013 | Zhou et al. |
| 2013/0235559 A1 | 9/2013 | Bergquist |

OTHER PUBLICATIONS

Korean Intellectual Propery Office, Written Opinion of the ISA, PCT/US2015/026300 (published as WO2016/167788), Apr. 22, 2016.

* cited by examiner

TRANSFLECTIVE LIQUID CRYSTAL DISPLAY

BACKGROUND OF THE INVENTION

1. Field of the Invention

The present invention relates to liquid crystal display (hereinafter "LCD") panels and, more particularly, to transflective LCD panels.

2. Description of Related Art

In a transflective LCD panel, ambient light may be reflected off a mirror and its color may be produced in the reflective portion of a sub-pixel contained within a pixel in the panel's pixel array. In contrast, light produced from within the panel may be transmitted through a filter and its color may be produced in the transmissive portion of the same sub-pixel. Typically, the color produced by the reflective portion of the sub-pixel may be a de-saturated color, while the color produced by the transmissive portion of the sub-pixel may be a fully saturated color. In low ambient light conditions, the produced color may be a color with good optical properties. In bright ambient light conditions, however, the de-saturated color from the reflective portion of the sub-pixel dominates and, thereby, diminishes the optical properties of the produced color.

In U.S. Pat. No. 7,636,076, an additional color-less sub-pixel, referred to as sub-pixel M, is used to increase the optical properties of the produced color in bright ambient light conditions. In U.S. Pat. No. 7,760,297, an additional sub-pixel is also used to increase the optical properties of the produced color in bright ambient light conditions. Here, the additional sub-pixel has a color filter that complements the primary color filters. For example, the additional sub-pixel may have a cyan color filter.

BRIEF SUMMARY OF THE INVENTION

In accordance with one embodiment of the invention, a pixel of a transflective liquid crystal display panel having a controllable backlight comprises an array of sub-pixels and a color substrate with an array of colors corresponding to the array of sub-pixels, the array of colors comprising transmissive colors and reflective colors. The color substrate transmits at least one wavelength of light corresponding to the transmissive colors in the array of colors when the controllable backlight emits a first predetermined light level and, from substantially the same area in the color substrate, reflects at least one wavelength of light corresponding to the reflective colors in the array of colors when the controllable backlight emits a second predetermined light level. The transmissive colors may be primary or secondary colors, and the reflective colors may be primary or secondary colors.

In accordance with a second embodiment of the invention, a transflective liquid crystal display comprises a panel divided into an array of pixels, each pixel divided into an array of sub-pixels, the panel having a top substrate, a liquid crystal layer located behind the top substrate, a color substrate located behind the liquid crystal layer, and a controllable backlight system located behind the color substrate. The color substrate comprises an array of colors corresponding to the array of sub-pixels, the array of colors comprising transmissive colors and reflective colors, the reflective colors being the complement of the transmissive colors. The transmissive colors may be primary or secondary colors, and the reflective colors may be primary or secondary colors.

In this second embodiment, the color substrate transmits at least one wavelength of light corresponding to the transmissive colors in the array of colors when the controllable backlight emits a first predetermined light level and, from substantially the same area in the color substrate, reflects at least one wavelength of light corresponding to the reflective colors in the array of colors when the controllable backlight emits a second predetermined light level.

In both embodiments, the primary colors may form the top row of the array of sub-pixels, and the secondary colors may form the bottom row of the array of sub-pixels. The order of the primary colors in the top row of the array of sub-pixels may be red, green and blue, and the order of the secondary colors in the bottom row of the array of sub-pixels may be cyan, magenta, and yellow.

In an alternate embodiment for both embodiments of the invention, at least one of the primary colors and at least one of the secondary colors may form the top row of the array of sub-pixels, and at least one of the primary colors and at least one of the secondary colors may form the bottom row of the array of sub-pixels. The order of the primary and secondary colors in the top row of the array of sub-pixels may be either (1) red, magenta and blue or (2) cyan, green and yellow and the order of the secondary colors in the bottom row of the array of sub-pixels may be either (1) cyan, green and yellow or (2) red, magenta and blue.

In a further embodiment of both embodiments of the invention, the display panel may include a light sensor, the light sensor monitoring the level of ambient light entering the display panel. In various embodiments of this embodiment, (1) the first predetermined light level may be greater than the measured ambient light level and the second predetermined light level may be less than the measured ambient light level or (2) the first predetermined light level may be substantially equal to the second predetermined light level or (3) the first predetermined light level, the second predetermined light level, or both predetermined light levels may be between 55 percent and 105 percent of the measured ambient light level.

In a still further embodiment of both embodiments of the invention, the transmissive colors may be primary colors and the reflective colors may be secondary colors when the first predetermined light level is greater than the measured ambient light level, or the transmissive colors may be secondary colors and the reflective colors may be primary colors when the second predetermined light level is less than the measured ambient light level.

BRIEF DESCRIPTION OF THE SEVERAL VIEWS OF THE DRAWING

The foregoing features of the invention will be more readily understood by reference to the following detailed description, taken with reference to the accompanying drawings, in which.

DETAILED DESCRIPTION OF THE INVENTION

Figure 1:
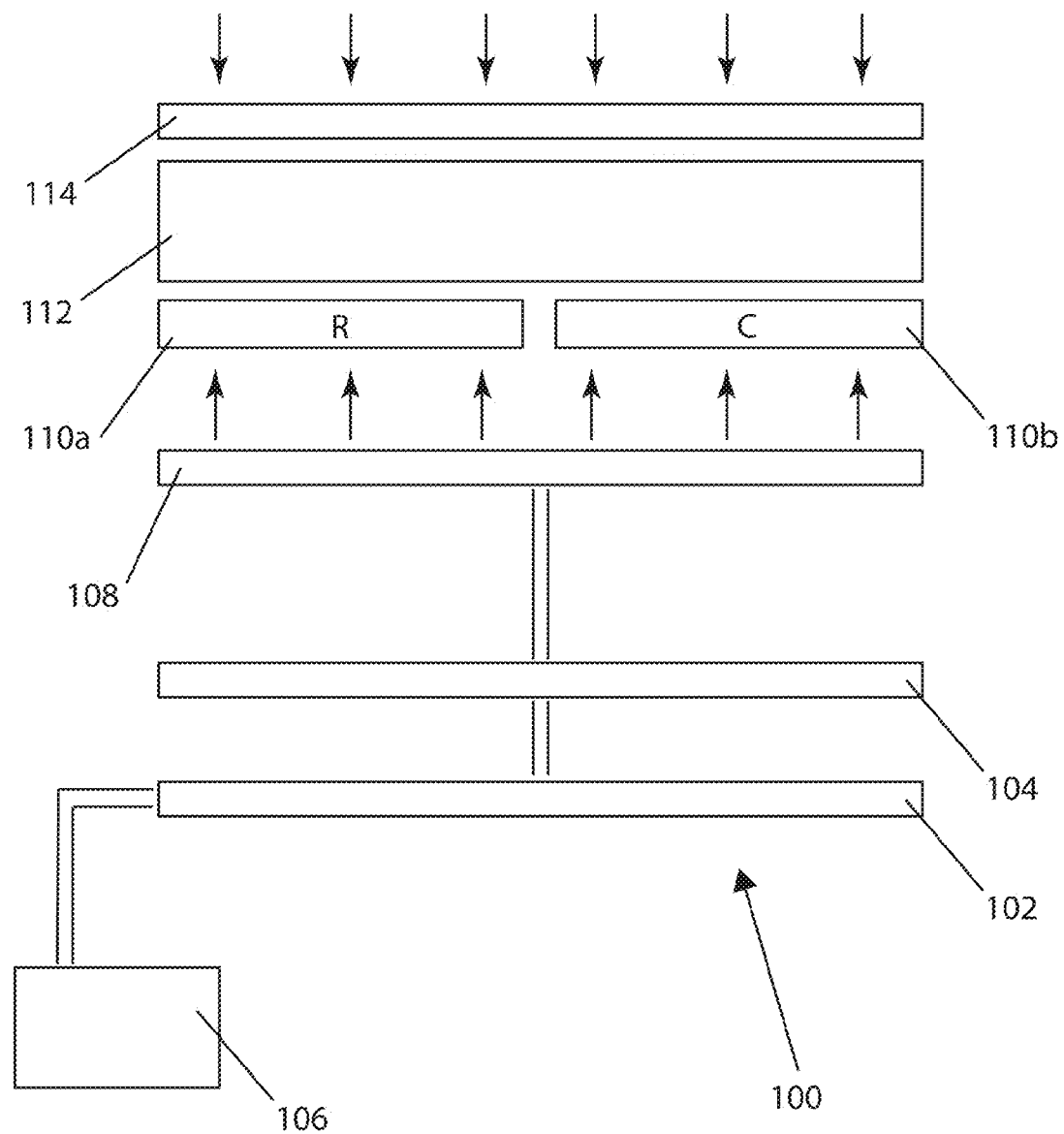
FIG. 1 is a schematic representation of a transflective LCD panel, in accordance with an embodiment of the invention.

FIG. 1 is a schematic representation of a transflective LCD panel, in accordance with an embodiment of the invention. In panel 100, processing unit 102 controls graphic-processing unit 104, and processing unit 102, in conjunction with ambient light sensor 106, controls backlight 108. In operation, ambient light sensor 106 monitors the level of ambient light entering panel 100. When the level of ambient light brightens to a particular level, as discussed in more detail below, ambient light sensor 106 signals processing unit 102 to turn off backlight 108. In this light mode, color substrates 110a and 110b act as mirrors and reflect the ambient light. When the level of ambient light dims to a particular level, as discussed in more detail below, ambient light sensor 106 signals processing unit 102 to turn on backlight 108. In this light mode, color substrates 110a and 110b act as filters and transmit the light emitted from backlight 108.

In an alternative embodiment, processing unit 102 may signal graphic-processing unit 104 and graphic-processing unit 104 may control backlight 108. Or, in another alternative embodiment, ambient light sensor 106 may send its signal to graphic-processing unit 104 (rather than processing unit 102) and graphic-processing unit 104 may control backlight 108.

As a person of ordinary skill in art understands, processing unit 102 may be a central processing unit ("CPU"), a sub-processing unit, or a co-processing unit.

In all light modes, the light passes through liquid crystal layer 112, which is composed of numerous liquid crystals (not shown), and through diffusion substrate 114. The liquid crystals control the intensity, that is, the brightness, of the reflected or transmitted light.

Figure 4:
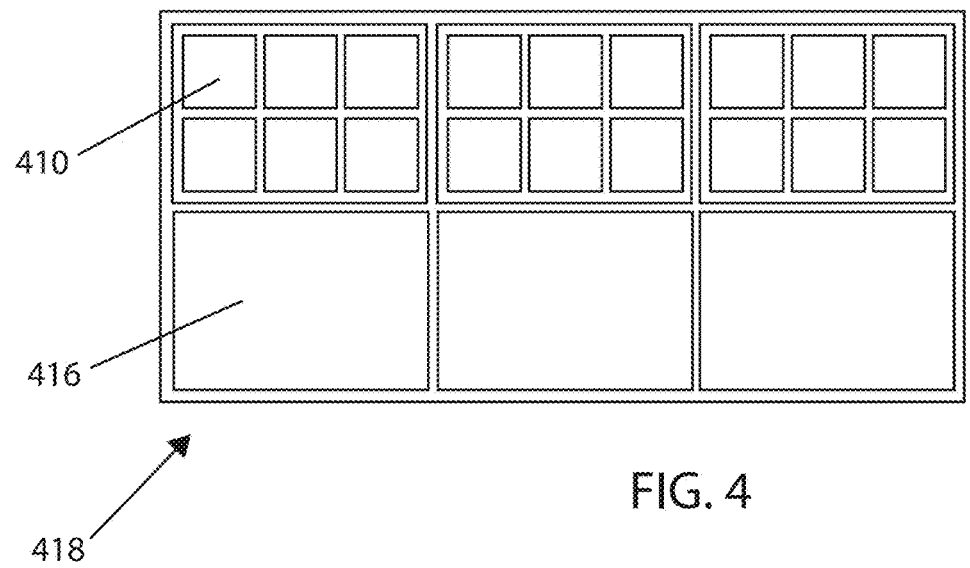
FIG. 4 is a schematic representation of a pixel array, in accordance with an embodiment of the invention, of a transflective LCD.

The transflective LCD panel described in FIG. 1 further comprises a pixel array. As shown in FIG. 4, which is a schematic representation of a pixel array in accordance with an embodiment of the invention, the pixel array (denoted as 418) contains numerous pixels (denoted as 416), and each pixel contains numerous sub-pixels (denoted as 410). The color substrates (for example, 110a and 110b) are arrayed in correspondence to the array of sub-pixels. In other words, each sub-pixel reflects the reflective color of its color substrate and transmits the transmissive color of its color substrate.

Figure 2A:
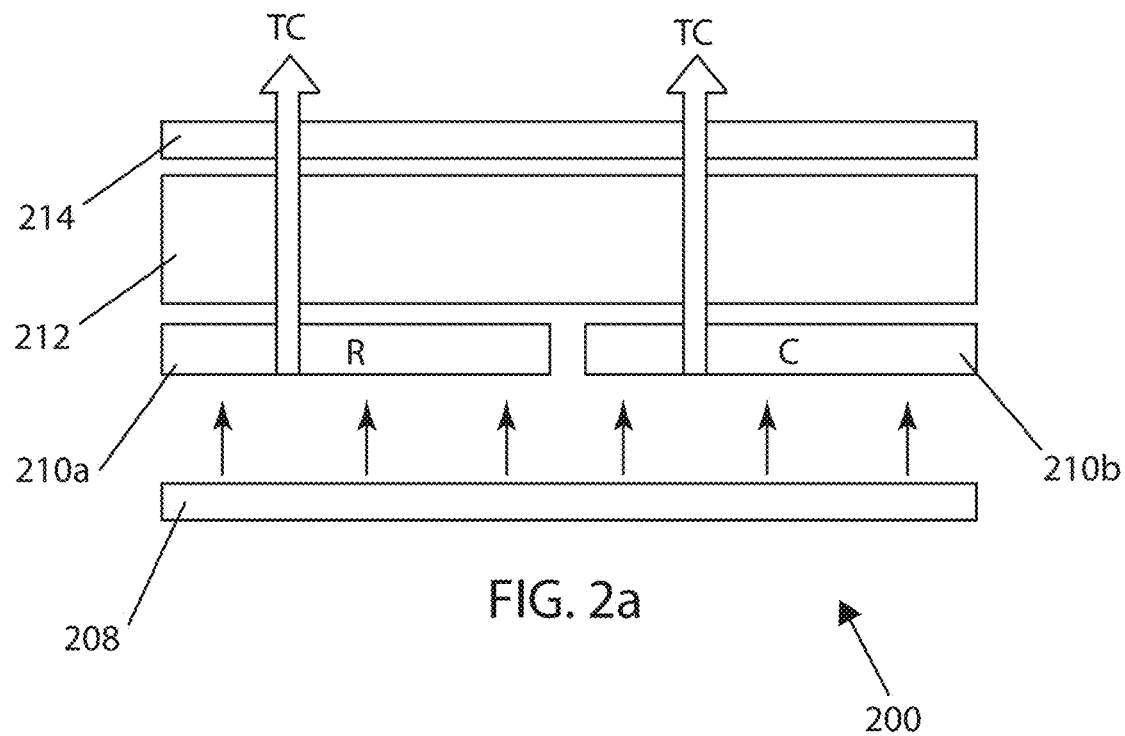
FIG. 2a is a schematic representation of a transflective LCD, in accordance with an embodiment of the invention, in transmissive light mode.
Figure 2B:
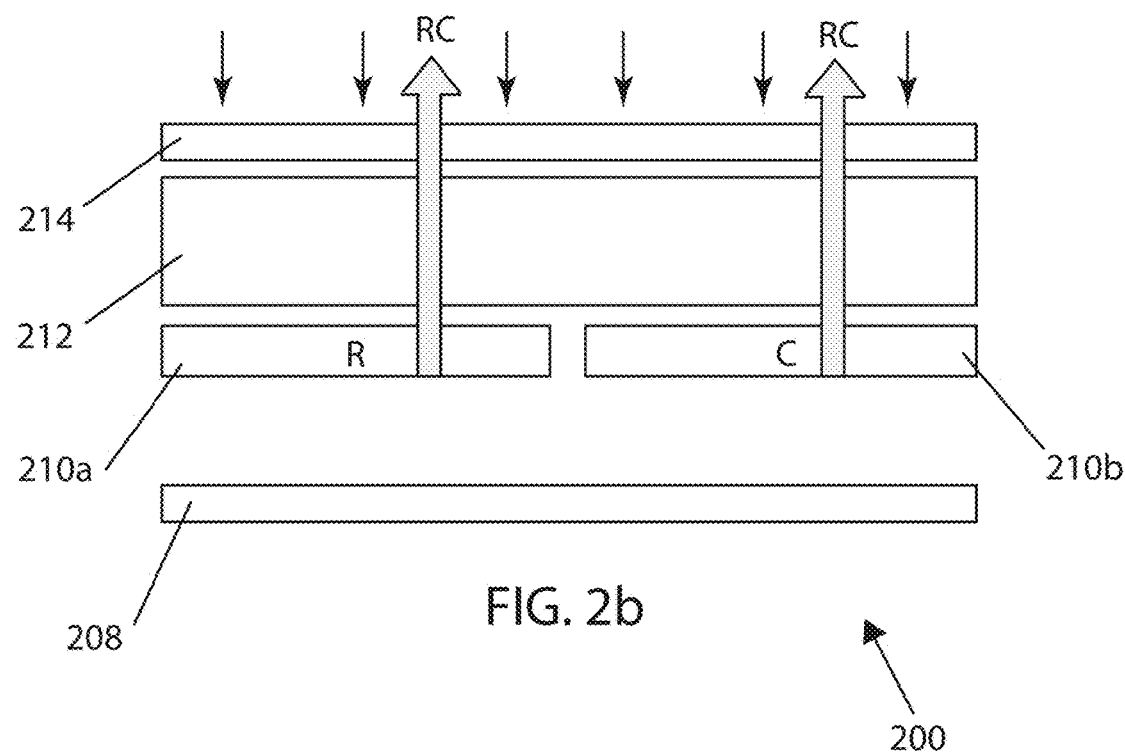
FIG. 2b is a schematic representation of a transflective LCD, in accordance with an embodiment of the invention, in reflective light mode.

As shown in FIGS. 2a and 2b, which are schematic representations of a transflective LCD in accordance with an embodiment of the invention, the transmissive color of color substrate 210a (denoted as TC) is different than the reflective color of color substrate 210a (denoted as RC). Similarly, the transmissive color of color substrate 210b is different than the reflective color of color substrate 210b. For example, color substrate 210a may transmit red light, but reflect cyan light. In contrast, color substrate 210b may transmit cyan light, but reflect red light. In industry parlance, this type of color substrate may be referred to as a dichroic filter, dichroic mirror, dichroic filter/mirror, or an interference filter.

The color substrates may be composed of a thin, transparent spacer—such as glass (for example, borofloat glass) or thermoplastic elastomers (such as polycarbonate)—that has been coated on at least one side. As understood by a person of ordinary skill in the art, the spacer is coated with one or more thin layers of metal oxides—such as chromium, silicon, titanium, magnesium, aluminum, zirconium, etc. Typically, the coating is applied to the spacer in a vacuum chamber under high temperature. The optic properties of the coatings, depending on color choices and usage, may range from no reflectivity, to partial reflectivity, to full reflectivity. In an alternate embodiment, the color substrates may also be composed of glass that is dyed or lacquered, gelatin that is dyed or lacquered, synthetic polymers that are dyed or lacquered, or any material that is created or transformed to meet the required optic properties in which either the transmissive color of the material may be selected or the reflective color of the material may be selected.

For the transflective LCD panel described herein, the optic properties might include color substrates in which the transmissive color is the complement of the reflective color. For example, a color substrate that transmits red might reflect cyan, a color substrate that transmits magenta might reflect green, a color substrate that transmits blue might reflect yellow, etc.

Figure 3:
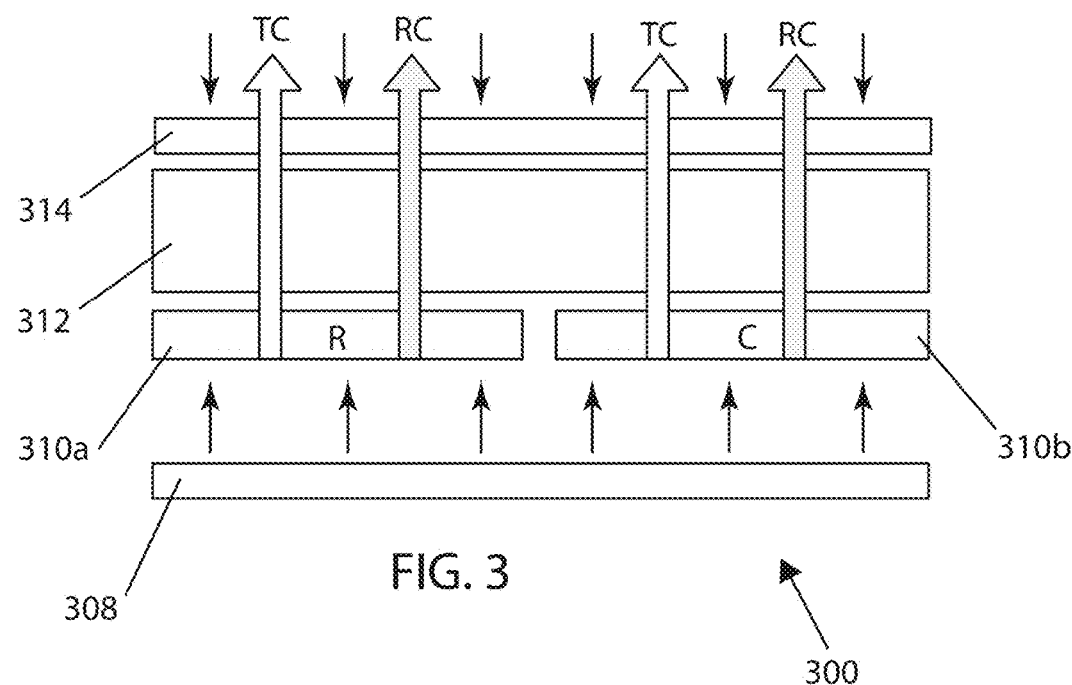
FIG. 3 is a schematic representation of a transflective LCD, in accordance with an embodiment of the invention, in transmissive and reflective light mode.

As shown in FIG. 3, which is a schematic representation of a transflective LCD in accordance with an embodiment of the invention, as the level of ambient light approaches the level of light emitted from backlight 308, panel 300 is operating in both transmissive and reflective light mode. This transflective light mode stems from the optic properties of color substrates 310a and 310b. Unlike most conventional transflective LCD panels, which have sub-pixels with transmissive and reflective regions, color substrates 310a and 310b do not have transmissive and reflective regions. Rather, under certain lighting conditions, color substrates 310a and 310b may be acting as a filter (transmissive light mode) and a mirror (reflective light mode) at the same, or substantially the same, moment in time and from the same, or substantially the same, place on the substrate.

In the transflective LCD panel described herein, this transflective light mode is foremost when the level of the ambient light is the same as, or substantially the same as, the level of the light emitted from the backlight. As understood by a person of ordinary skill in the art, the interaction occurring between the transmitted light and the reflected light at this point in time changes the saturation and/or the wavelength of the displayed colors. For example, when the transmitted light is the complement of the reflected light, the displayed colors will become less saturated—that is, approach gray-scale—or, when the reflected light exceeds the transmitted lights, the display colors will be inverted.

As discussed above in regard to FIG. 1, ambient light sensor 106 monitors the level of ambient light and, via processing unit 102 and/or graphic-processing unit 104, controls backlight 108. The type of control may range from two-state control to variable-state control. In two-state control, backlight 108 has two states—on and off. In contrast, in variable-state control, backlight 108 may have two states—on and partial on—or may have three states—on, partial on, and off.

In two-state control, when backlight 108 is on (that is, emitting light), the processed signal from ambient light sensor 106 turns backlight 108 off, and when backlight 108 is off, the processed signal from ambient light sensor 106 turns backlight 108 on. Depending on the device in which panel 100 is installed, as well as the device's usage and/or application, ambient light sensor 106 may send its signal when the level of ambient light is the same as, or within some percent of, the level of light emitted from backlight 108. For example, if backlight 108 has a lux level of 100, then ambient light sensor 106 may send its signal when the lux level of ambient light is 100, when the lux level is 80 (that is, 80% of the lux level of backlight 108), or when the lux level is 120 (that is, 120% of the lux level of backlight 108).

When panel 100 is displaying reflective light (that is, backlight 108 is off), ambient light sensor may send its signal to turn on backlight 108 when the level of ambient light is the same as, or within some percent of, the "rated" level of light emitted from backlight 108 (that is, the level of light when backlight 108 is turned on). For example, if backlight 108 has a lux level of 100 (when turned on), then ambient light sensor 106 may send its signal when the lux level of ambient light is 100, when the lux level is 80 (that is, 80% of the lux level of backlight 108), or when the lux level is 120 (that is, 120% of the lux level of backlight 108).

In variable-state control, the level of light emitted from backlight 108 varies in accordance with the LCD panel settings, which may be set by the manufacturer and/or by the user. These LCD panel settings may include, for example, the auto-brightness setting and the brightness level setting. In turn, ambient light sensor 106 uses this "calculated" level of light emitted from backlight 108 to control backlight 108. In a manner similar to two-state control, ambient light sensor 106 may send its signal when the level of ambient light is the same as, or within some percent of, the "calculated" level of light emitted from backlight 108.

In an alternate embodiment, the light reflectance level of panel 100 may be used in the calculations for controlling backlight 108. For example, in either two-state control or variable-state control, the light reflectance level may modify the level of ambient light at which ambient light sensor 106 sends its signal for controlling backlight 108.

In either two-state control or variable-state control, the process of controlling backlight 108 may be performed by processing unit 102 or graphic-processing unit 104. In an alternate embodiment of the invention, the process may be performed by ambient light sensor 106. As noted above, processing unit 102 may be a central processing unit ("CPU"), a sub-processing unit, or a co-processing unit.

Figure 5:
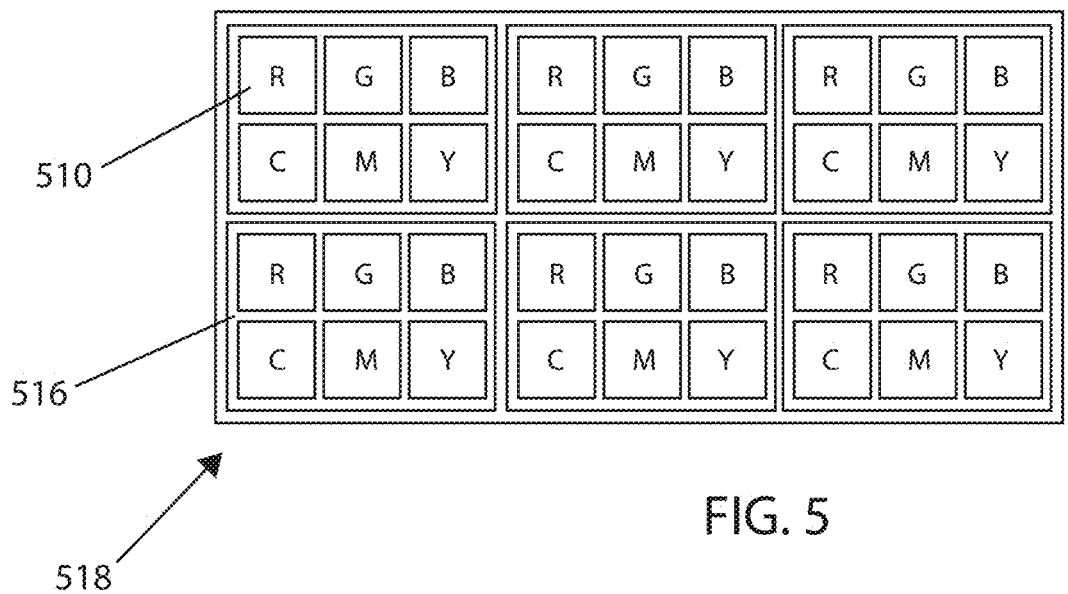
FIG. 5 is a schematic representation of a first embodiment for the pixel array of the transflective LCD shown in FIG. 4.

As discussed above in regard to FIGS. 1 and 4, the transflective LCD panel described herein comprises a pixel array. As shown in FIG. 5, which is a schematic representation of an embodiment for the pixel array, the pixel array (denoted by 518) contains numerous pixels (denoted by 516), each of which contains an array of six sub-pixels (denoted by 510) aligned in three columns and two rows. The corresponding color substrates for the sub-pixels are the primary colors (red, green, blue) and the secondary colors (cyan, magenta, yellow). In this embodiment for pixel 516, the primary color sub-pixels form the top row of the sub-pixel array, and the secondary color sub-pixels form the bottom row of the sub-pixel array. In an alternate embodiment for the pixel 516, the secondary color sub-pixels form the top row of the sub-pixel array, and the primary color sub-pixels form the bottom row of the sub-pixel array.

Figure 6:
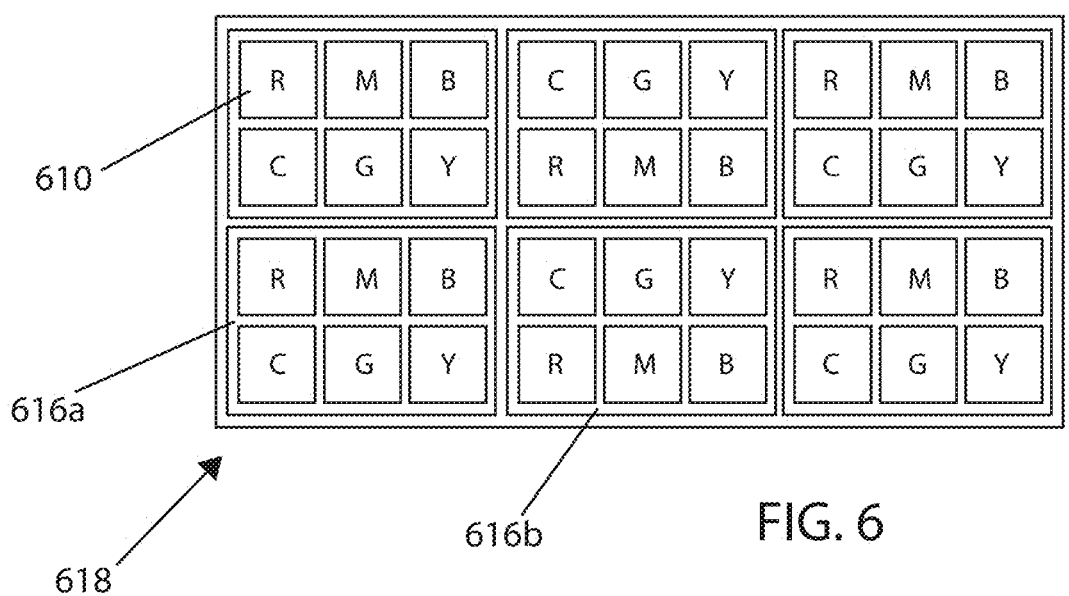
FIG. 6 is a schematic representation of a second embodiment for the pixel array of the transflective LCD shown in FIG. 4.

In FIG. 6, which is a schematic representation of an alternate embodiment for the pixel array, the pixel array (denoted by 618) contains numerous pixels (denoted by 616a and 616b), each of which contains an array of six sub-pixels (denoted by 610) aligned in three columns and two rows. In pixel 616a, the top row of the sub-pixel array is formed by two primary color sub-pixels bordering one secondary color sub-pixel, and the bottom row of the sub-pixel array is formed by two secondary color sub-pixels bordering one primary color sub-pixel. In contrast, in pixel 616b, the top row of the sub-pixel array is formed by two secondary color sub-pixels bordering one primary color sub-pixel, and the bottom row of the sub-pixel array is formed by two primary color sub-pixels bordering one secondary color sub-pixel. In this embodiment for pixel array 618, pixel 616a forms the odd-numbered columns of pixel array 618, and pixel 616b forms the even-numbered columns of pixel array 618. In an alternate embodiment for pixel array 618, pixel 616a forms the odd-numbered columns of pixel array 618, and pixel 616b forms the even-numbered columns of pixel array 618.

Figure 7A:
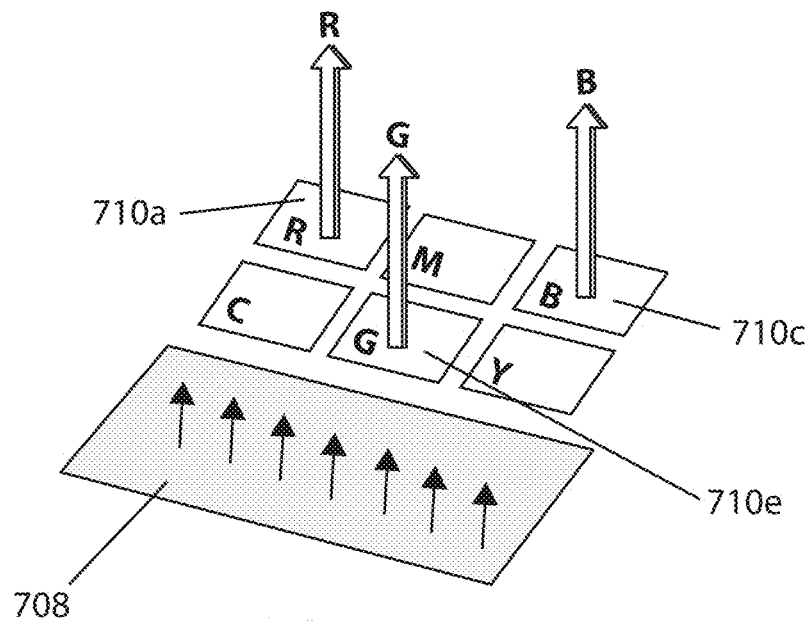
FIG. 7a is a perspective view of a pixel array, in accordance with an embodiment of the invention, in transmissive light mode.

FIG. 7a shows a perspective view of the pixel array described in FIG. 6 in transmissive light mode. In this embodiment, backlight 708 is on, that is, it is emitting light, and the transmitted color is generated from primary color sub-pixels 710a, 710c and 710e (which transmit red, blue and green respectively). In a further embodiment, secondary color sub-pixels 710b, 710d and 710f (which transmit magenta, cyan and yellow, respectively) also may be used and, thereby, produce brighter, more saturated colors.

Figure 7B:
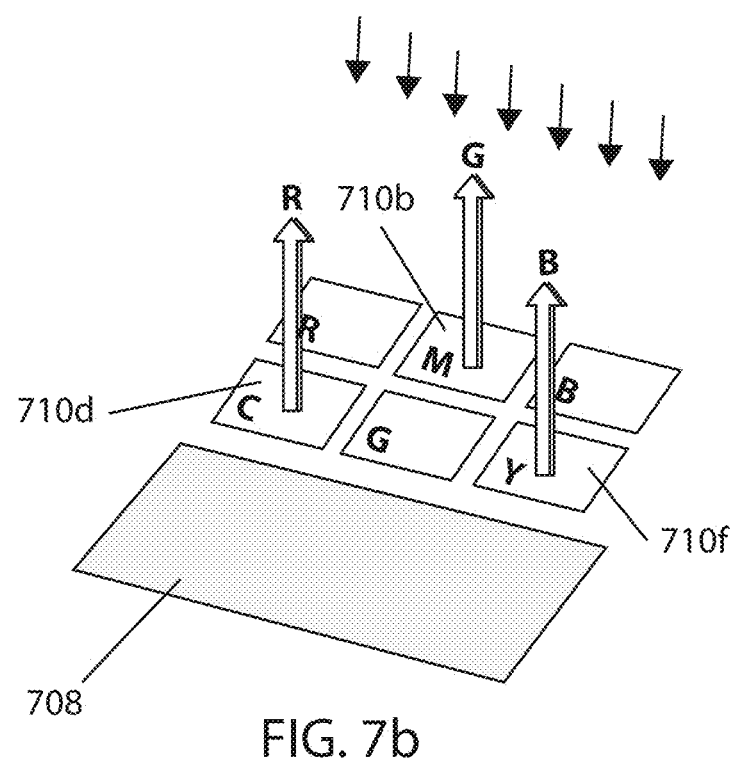
FIG. 7b is a perspective view of a pixel array, in accordance with an embodiment of the invention, in reflective light mode.

FIG. 7b shows a perspective view of the pixel array described in FIG. 6 in reflective light mode. In this embodiment, backlight 708 is off, that is, it is not emitting light, and the reflected color is generated from secondary color sub-pixels 710b, 710d and 710f (which reflect green, red and blue, respectively). In a further embodiment, primary color sub-pixels 710a, 710c and 710e (which reflect cyan, yellow and magenta, respectively) also may be used and, thereby, produce brighter, more saturated colors.

The pixel arrays described herein may need to be controlled via a six-color signal (rather than the standard three-color signal). As understood by a person of ordinary skill in the art, the standard three-color signal output by a graphic-processing unit may be readily converted into the six-color signal, or the graphic-processing unit may be readily converted to output the six-color signal.

Although various exemplary embodiments of the invention have been disclosed, it should be apparent to those skilled in the art that various changes and modifications can be made which will achieve some of the advantages of the invention without departing from the true scope of the invention. The appended claims are intended to cover these and other obvious modifications.

I claim:

1. A pixel of a transflective liquid crystal display panel, the display panel having a controllable backlight, comprising:
   an array of sub-pixels;
   a color substrate with an array of colors corresponding to the array of sub-pixels, the array of colors comprising transmissive colors and reflective colors, the reflective colors being the complement of the transmissive colors, the color substrate transmitting at least one wavelength of light corresponding to the transmissive colors in the array of colors when the controllable backlight emits a first predetermined light level and, from substantially the same area in the color substrate, reflecting at least one wavelength of light corresponding to the reflective colors in the array of colors when the controllable backlight emits a second predetermined light level; and wherein the transmissive colors are primary or secondary colors and the reflective colors are primary or secondary colors.

2. The pixel according to claim 1, wherein the primary colors form the top row of the array of sub-pixels, and the secondary colors form the bottom row of the array of sub-pixels.

3. The pixel according to claim 1, wherein at least one of the primary colors and at least one of the secondary colors form the top row of the array of sub-pixels, and at least one of the primary colors and at least one of the secondary colors form the bottom row of the array of sub-pixels.

4. The pixel according to claim 2, wherein the order of the primary colors in the top row of the array of sub-pixels is red, green and blue, and the order of the secondary colors in the bottom row of the array of sub-pixels is cyan, magenta and yellow.

5. The pixel according to claim 3, wherein the order of the primary and secondary colors in the top row of the array of sub-pixels is either red, magenta and blue or cyan, green and yellow; and the order of the primary and secondary colors in the bottom row of the array of sub-pixels is either cyan, green and yellow or red, magenta and blue.

6. The pixel according to claim 1, wherein the display panel further comprises a light sensor, the light sensor measuring the level of ambient light entering the display panel.

7. The pixel according to claim 6, wherein the first predetermined light level is greater than the measured ambient light level and the second predetermined light level is less than the measured ambient light level.

8. The pixel according to claim 1, wherein the first predetermined light level is substantially equal to the second predetermined light level.

9. The pixel according to claim 6, wherein the first predetermined light level, the second predetermined light level, or both predetermined light levels are between 55 percent and 105 percent of the measured ambient light level.

10. A liquid crystal display panel comprising a plurality of pixels wherein at least one of the pixels is the pixel of claim 1.

11. A transflective liquid crystal display comprising:
a panel divided into an array of pixels, each pixel divided into an array of sub-pixels, the panel having a top substrate;
a liquid crystal layer located behind the top substrate;
a color substrate located behind the liquid crystal layer, the color substrate comprising an array of colors corresponding to the array of sub-pixels, the array of colors comprising transmissive colors and reflective colors, the reflective colors being the complement of the transmissive colors, wherein the transmissive colors are primary or secondary colors, and the reflective colors are primary or secondary colors;
a controllable backlight system located behind the color substrate; and
the color substrate transmitting at least one wavelength of light corresponding to the transmissive colors in the array of colors when the controllable backlight emits a first predetermined light level and, from substantially the same area in the color substrate, reflecting at least one wavelength of light corresponding to the reflective colors in the array of colors when the controllable backlight emits a second predetermined light level.

12. The panel according to claim 11, wherein the primary colors form the top row of the array of sub-pixels, and the secondary colors form the bottom row of the array of sub-pixels.

13. The panel according to claim 11, wherein at least one of the primary colors and at least one of the secondary colors form the top row of the array of sub-pixels, and at least one of the primary colors and at least one of the secondary colors form the bottom row of the array of sub-pixels.

14. The panel according to claim 12, wherein the order of the primary colors in the top row of the array of sub-pixels is red, green and blue, and the order of the secondary colors in the bottom row of the array of sub-pixels is cyan, magenta and yellow.

15. The panel according to claim 13, wherein the order of the primary and secondary colors in the top row of the array of sub-pixels is either red, magenta and blue or cyan, green and yellow; and the order of the primary and secondary colors in the bottom row of the array of sub-pixels is either cyan, green and yellow or red, magenta and blue.

16. A pixel of a transflective liquid crystal display panel, the display panel having a controllable backlight, comprising:
an array of sub-pixels;
a color substrate with an array of colors corresponding to the array of sub-pixels, the array of colors comprising transmissive colors and reflective colors, the reflective colors being the complement of the transmissive colors, the color substrate transmitting at least one wavelength of light corresponding to the transmissive colors in the array of colors when the controllable backlight emits a first predetermined light level and, from substantially the same area in the color substrate, reflecting at least one wavelength of light corresponding to the reflective colors in the array of colors when the controllable backlight emits a second predetermined light level.

17. The pixel according to claim 16, wherein the display panel further comprises a light sensor, the light sensor measuring the level of ambient light entering the display panel.

18. The pixel according to claim 17, wherein the transmissive colors are primary colors and the reflective colors are secondary colors when the first predetermined light level is greater than the measured ambient light level.

19. The panel according to claim 17, wherein the transmissive colors are secondary colors and the reflective colors are primary colors when the second predetermined light level is less than the measured ambient light level.

20. A liquid crystal display panel comprising a plurality of pixels wherein at least one of the pixels is the pixel of claim 16.

* * * * *